(12) United States Patent
Doi

(10) Patent No.: US 6,646,818 B2
(45) Date of Patent: Nov. 11, 2003

(54) PANORAMIC IMAGING LENS

(75) Inventor: Tadashi Doi, Toyama (JP)

(73) Assignee: Tateyama R&D Co., Ltd., Toyama (JP)

( * ) Notice: Subject to any disclaimer, the term of this patent is extended or adjusted under 35 U.S.C. 154(b) by 0 days.

(21) Appl. No.: 10/101,090

(22) Filed: Mar. 20, 2002

(65) Prior Publication Data

US 2003/0099045 A1 May 29, 2003

(30) Foreign Application Priority Data

Nov. 29, 2001  (JP) .................................... 2001-364787

(51) Int. Cl.⁷ ........................ G02B 13/06; G02B 17/08
(52) U.S. Cl. ................................ 359/725; 359/729
(58) Field of Search ............................. 359/725, 726, 359/727, 728, 729

(56) References Cited

U.S. PATENT DOCUMENTS

| 4,566,763 A | 1/1986 | Greguss | 359/725 |
|---|---|---|---|
| 5,473,474 A | 12/1995 | Powell | 359/725 |

FOREIGN PATENT DOCUMENTS

| JP | 46-38377 B | 11/1971 |
|---|---|---|
| JP | 61-155819 U | 9/1986 |
| JP | 02-251903 A | 10/1990 |
| JP | 11-174331 A | 7/1999 |
| JP | 2000-004383 A | 1/2000 |
| JP | 2000-010002 A | 1/2000 |
| JP | 2000-284179 A | 10/2000 |

Primary Examiner—Scott J. Sugarman
Assistant Examiner—Deborah Raizen
(74) Attorney, Agent, or Firm—Kubovcik & Kubovcik

(57) ABSTRACT

A panoramic imaging lens having an annular light incident surface formed in a substantial convex lens form; a first reflective surface formed in an annular concave mirror form to reflect light inside the lens; a second reflective surface provided at a central part inside the annular light incident surface to reflect the reflected light from the first reflective surface toward an inner part of the annular first reflective surface; and a light outgoing surface positioned at a central part inside the annular first reflective surface and opposing the second reflective surface to transmit light. A non-reflective part exerting no regular reflection of light is provided on a light path toward the light incident surface amongst light paths of light proceeding to agree with a light path of imaging light incident on and refracted at the light incident surface and proceeding inside the lens.

6 Claims, 7 Drawing Sheets

PRIOR ART

PRIOR ART

PANORAMIC IMAGING LENS

BACKGROUND OF THE INVENTION

1. Field of the Invention

The present invention relates to a panoramic imaging lens capable of imaging a lateral perspective of 360° circumference as an annular image.

2. Description of the Related Art

As a panoramic imaging lens that can image a perspective of 360° circumference at one time, lenses disclosed in U.S. Pat. Nos. 4,566,763 and 5,473,474 have been conventionally known. The panoramic imaging lens 1 is formed with a light permeable material, such as optical glass, a transparent resin and the like, in a rotation symmetrical form around a light axis, which is a central axis of the lens as shown in FIG. 1. The panoramic imaging lens 1 has an annular light incident surface 2, on which lateral light from the 360° full circumference is incident; a first reflective surface 3 formed in an annular form that is adjacent to and substantially opposes the light incident surface 2 to reflect the light inside the lens 1; and a second reflective surface 4 provided at a central part inside the annular light incident surface 2 to reflect the reflected light from the first reflective surface 3 inside the annular first reflective surface 3. A light outgoing surface 5 transmitting the light from the second reflective surface 4 is formed at a position opposing the second reflective surface 4 in a central part of the first reflective surface 3. The light incident surface 2 is formed in a form of a convex lens bulging laterally, and the second reflective surface 4 inside it is formed in a concave form, whereby the inner surface of the lens 1 is a reflective surface in a form of a convex mirror. The first reflective surface 3 adjacent to the light incident surface 2 is also formed in a form of a convex surface bulging laterally, and the inner surface of the lens 1 is an annular reflective surface of a concave mirror form directed to the second reflective surface 4. The light outgoing surface 5 is appropriately formed in a concave or convex surface or a planar surface.

A panoramic imaging system using the panoramic imaging lens 1 comprises, as shown in FIG. 1, a panoramic imaging adapter 10 having the panoramic imaging lens 1 and a relay lens 6 for image formation provided on the light axis, and an imaging device 8, such as a video camera and the like, to which the panoramic imaging adapter 10 is attached. The imaging device 8 comprises a lens system 9 for acquiring an image, an imaging element 7, such as a CCD and the like, provided at the image focus location thereof, and a necessary controlling sections and the like not shown in the figure.

A panoramic landscape 11 of 360° circumference acquired by the panoramic imaging lens 1 is converted to an electric signal by the imaging element 7 of the imaging device 8 and projected on various kinds of a monitoring device 14, such as a liquid crystal, a CRT and the like.

With respect to the panoramic imaging lens 1, in the case where the panoramic imaging adapter 10 is arranged in such a direction that the light incident surface 2 turns upward as shown in FIG. 1, the lowermost light L1 from the panoramic landscape 11 of 360° circumference amongst the incident light incident on the light incident surface 2 of the panoramic imaging lens 1 is refracted at the light incident surface 2, then reflected at the opposing first reflective surface 3 toward the second reflective surface 4, and further reflected at the second reflective surface 4 to outgo from the light outgoing surface 5, followed by being imaged through the relay lens 6 on a circumferential part of the imaging element 7. In the case where the uppermost light L2 from the panoramic landscape 11 amongst the incident light is incident on the light incident surface 2, it is reflected at the light incident surface 2 of the panoramic imaging lens 1, then reflected at the opposing first reflective surface 2 toward the second reflective surface 4, and further reflected at the second reflective surface to outgo from the light outgoing surface 5, followed by being imaged through the relay lens 6 on a central part of the imaging element 7. According to the foregoing mechanisms, the panoramic landscape 11 is imaged in an annular form on the imaging element 7 and projected as an annular two-dimensional image 12 on the monitoring device 14.

According to the foregoing conventional technique, there is such a problem that a part of the light incident on the light incident surface 2 of the panoramic imaging lens 1 is incident on the imaging element 7 as flare and ghost. The phenomenon of flare or the like is caused by mixing external noise light Ln functioning as flare or the like with the regular imaging light L0 on the light path inside the lens as shown in FIG. 2A. The noise light Ln is incident on the light incident surface 2 of the panoramic imaging lens 1, and after reflected on the first reflective surface 3 and the second reflective surface 4 inside the panoramic imaging lens 1, most of the noise light Ln again outgoes from the light incident surface 2 as shown in FIG. 2A. However, a slight part of the noise light Ln1 amongst the noise light Ln is inwardly reflected on the light incident surface 2 inside the panoramic imaging lens 1 and proceeds to agree with the light path of the regular imaging light L0 in the lens. Therefore, the noise light Ln1, which is a part of the noise light Ln, is inwardly reflected on the light incident surface 2, and then it agrees with the light path of the regular imaging light L0 to reach the imaging element 7, and is projected as flare and ghost.

The invasion path of the noise light Ln includes, in addition to the foregoing, noise light Ln2 causing flare or the like that suffers repeated reflection inside the panoramic imaging lens 1 and then agrees with the incident path of the regular imaging light L0 by the inward reflection on the light incident surface 2 as shown in FIG. 2B. Moreover, as shown in FIG. 2C, noise light Ln3 causing flare or the like is included, which after reflected once inside,the panoramic imaging lens 1, agrees with the incident light path of the regular imaging light L0 by the inward reflection on the light incident surface 2.

With respect to the flare and ghost, partial strong light is particularly liable to function as the noise light Ln when light is incident on the panoramic imaging lens 1 from the 360° circumference. In the case where the panoramic imaging system is used as a surveillance camera or the like, there is such a problem and the like that the flare and ghost adversely affect the control of light amount to deteriorate quality of the pictured image.

SUMMARY OF THE INVENTION

The invention has been developed in view of the foregoing problems associated with the conventional technique, and an object thereof is to provide a panoramic imaging lens capable of certainly suppressing noise light causing flare and ghost with a simple structure.

Specifically, the invention relates to a panoramic imaging lens comprising a light transmitting material, such as optical glass, a transparent resin and the like, and comprising an annular light incident surface formed in a rotation symmetrical form around a light axis, which is a central axis of the lens in a substantial convex lens form bulging to enable incident of lateral light from the 360° full circumference; a first reflective surface formed in an annular concave mirror form bulging outwardly that substantially opposes the light incident surface to reflect light inside the lens; a second reflective surface formed in a convex mirror form provided at a central part inside the annular light incident surface to reflect the reflected light from the first reflective surface toward an inner part of the annular first reflective surface; and a light outgoing surface positioned at a central part inside the annular first reflective surface and opposing the second reflective surface to transmit the light from the second reflective surface. The panoramic imaging lens is a panoramic imaging lens that is equipped with a non-reflective part exerting no regular reflection of light on a light path toward the light incident surface amongst light paths of light proceeding to agree with a light path of imaging light incident on the light incident surface and being refracted and proceeding inside the lens, which are light paths of light partly and inwardly reflected by the light incident surface from the interior of the lens toward the interior of the lens.

The non-reflective part of the invention may be a light absorbing part formed to be black or a dark color that absorbs light but does not reflect light, la diffused reflective part formed to be a roughened surface that diffusely reflects light but does not regularly reflect light, or a combination thereof.

The non-reflective part may be an opening having a form of a cylinder, a crucible former or the like that is formed in a rotation symmetrical form around a light axis of the panoramic imaging lens from the light outgoing surface toward the second reflective surface of the lens, and the opening has such a depth that a bottom of the opening is at a position on a side of the light outgoing surface with respect to a line connecting a fringe of the light incident surface on a side of the first reflective surface.

The non-reflective part may also be an opening having a form of a cylinder that is formed in a rotation symmetrical form around a light axis of the panoramic imaging lens protruding from the light outgoing surface toward a direction opposite to the second reflective surface.

The non-reflective part may also be formed on at least one of a periphery of the light outgoing surface and the first reflective surface of the panoramic imaging lens in an annular form with a light axis of the light outgoing surface as a center.

The non-reflective part may also be formed on a side peripheral surface of the panoramic imaging lens formed between the light incident surface and the first reflective surface of the panoramic imaging lens.

DESCRIPTION OF THE PREFERRED EMBODIMENTS

Figure 3:
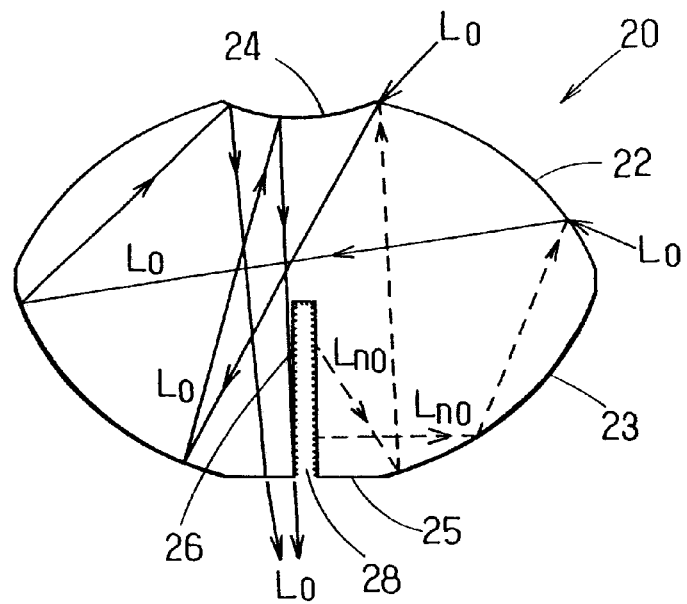
FIG. 3 is a cross sectional view showing a first embodiment of the panoramic imaging lens of the invention.

Embodiments of the invention will be described with reference to the drawings. FIG. 3 shows a first embodiment of the invention, and a panoramic imaging lens 20 of this embodiment is formed with optical glass or a transparent resin for lenses in a rotation symmetrical form around the light axis of the lens. The panoramic imaging lens 20 has an annular light incident surface 22, on which lateral light from the 360° full circumference is incident, for imaging a perspective of 360° circumference. The light incident surface 22 is formed to be a convex lens bulging laterally. A first reflective surface 23 reflecting the light incident from the annular light incident surface 22 to the interior of the lens 20 is formed adjacent to the light incident surface 22. A second reflective surface 24 reflecting the reflected light from the first reflective surface 23 to the inner part of the annular first reflective surface 23 is formed in the central part of the annular light incident surface 22. The first reflective surface 23 is formed to be a convex form bulging laterally, and the inner surface of the first reflective surface 23 on facing the interior of the lens 20 forms a reflective surface in a form of an annular concave mirror facing the direction of the second reflective surface 24. The second reflective surface 24 is formed to be a concave form, and the inner surface thereof facing the interior of the lens 20 forms a reflective surface in a form of a convex mirror. A light outgoing surface 25 transmitting the light from the second reflective surface 24 is formed on a central part of the annular first reflective surface 23 at a position opposing the second reflective surface 24.

The light incident surface 22, the first reflective surface 23 and the second reflective surface 24 are formed to be a spherical surface or a non-spherical surface that is appropriately defined by an appropriate equation, whereby imaged light of a panoramic image of 360° circumference outgoes from the light outgoing surface 25. The light outgoing surface 25 is formed to be a concave surface, a convex surface or a planar surface depending on the optical system.

Figure 1:
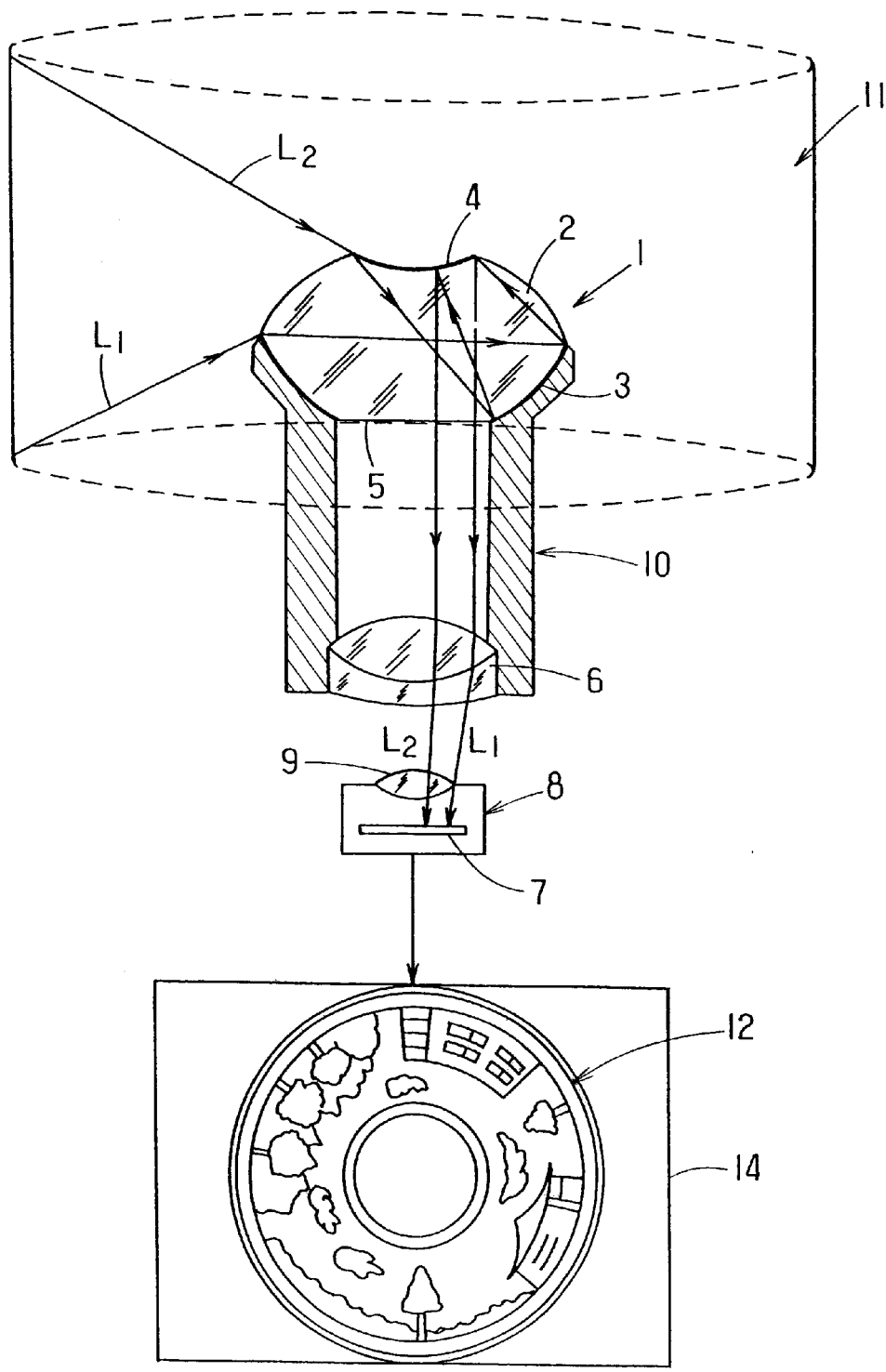
FIG. 1 is a schematic diagram showing the principal of a panoramic imaging lens.
Figure 2:
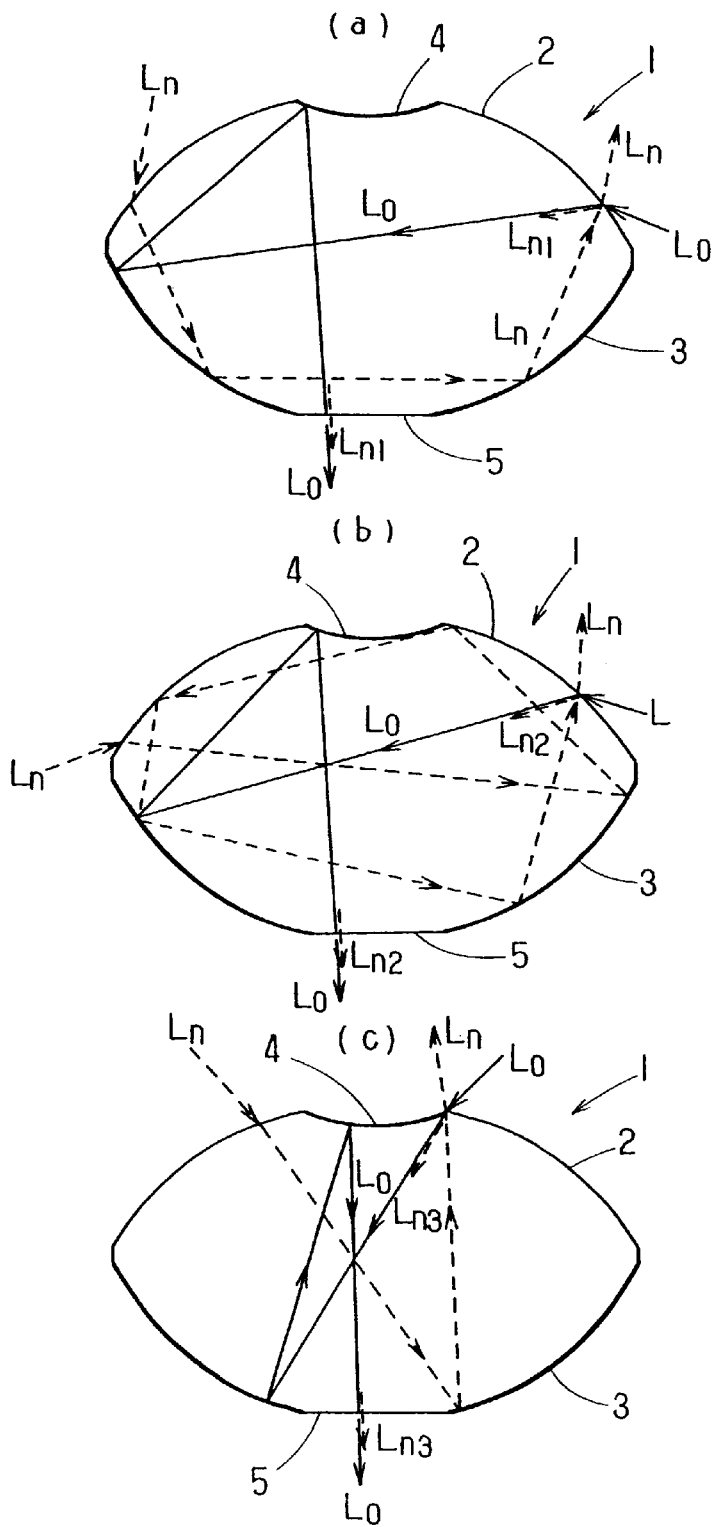
FIG. 2 is vertical cross sectional views showing the states of light transmission of conventional panoramic imaging lenses.

The panoramic imaging lens 20 is also used in a panoramic imaging system as similar to the case shown in FIG. 1, and it is provided in a panoramic imaging adapter 10 to enable panoramic imaging of 360° circumference through an imaging device 8, such as a video camera and the like.

The panoramic imaging lens 20 of this embodiment is equipped with a non-reflective part 26 that exerts no regular reflection of light on a light path toward the light incident surface 22 amongst light paths of light proceeding to agree with a light path of imaging light incident on the light incident surface 22 and being refracted and proceeding inside the lens, which are light paths inside the lens of light partly and inwardly reflected by the light incident surface 22 from the interior of the lens toward the interior of the lens. The non-reflective part 26 is an opening 28 having a cylindrical form formed from the light outgoing surface 25 toward the second reflective surface 24 in a rotation symmetrical form around the light axis, which is the rotation central axis of the panoramic imaging lens 20. The depth of the opening 28 is formed at a position that does not disturb the course of the imaging light L0, and is at a position on a side of the light outgoing surface 25 with respect to a line connecting a fringe of the light incident surface 22 on a side of the first reflective surface 23, and in this embodiment, the depth is about ½ of the thickness of the panoramic imaging lens 20.

The non-reflective part 26 is a light absorbing part formed to be black or a dark color that absorbs light but does not reflect light, a diffused reflective part formed to be a roughened surface that diffusely reflects light but does not regularly reflect light in a certain direction, or a combination thereof, and they are appropriately selected depending on the purpose.

Upon production of the panoramic imaging lens 20, in the case of optical glass, after forming to a prescribed shape, the light incident surface 22, the first reflective surface 23, the second light reflective surface 24 and the light outgoing surface 25 are polished, and then metallic thin films as light reflecting films are formed on the surfaces of the first reflective surface 23 and the second reflective surface 24 by vacuum deposition or the like. Before or after the procedures, the opening 28 of the non-reflective part 26 is opened, which is appropriately subjected to a surface roughening treatment depending on necessity, and then subjected to a treatment for coating the surface thereof with black or a dark color.

In the case where the panoramic imaging lens 20 is a resin lens, a transparent resin is injected to a metallic mold having a shape of the panoramic imaging lens 20 having the non-reflective part 26 formed to mold to a united body. Thereafter, as similar to the case of optical glass, metallic thin films as light reflecting films are formed on the surfaces of the first reflective surface 23 and the second reflective surface 24 by vacuum deposition or the like, and before or after the procedures, the opening 28 of the non-reflective part 26 is appropriately subjected to a surface roughening treatment depending on necessity, and then subjected to a treatment for coating the surface thereof with black or a dark color. It is also possible that the molding is completed at the state where the opening 28 is filled with a material that does not reflect light.

According to the panoramic imaging lens 20 of this embodiment, because the non-reflective part 26 is provided on a light path toward the light incident surface 22, which is a light path of light partly and inwardly reflected by the light incident surface 22 from the interior of the lens toward the interior of the lens to agree with a light path of the imaging light L0 to be a regular image, the noise light Ln0 reflected from the interior of the lens toward the interior of the lens to agree with the light path of the imaging light L0 inside the lens is limited to light from the non-reflective part 26. Noise light reaching the non-reflective part 26 from the exterior is blocked by the non-reflective part 26 and does not proceed toward the light incident surface 22 to agree with the light path of the imaging light L0 inside the lens. Because the non-reflective part 26 is black or of a dark color and is formed to be a roughened surface, the noise light Ln0 is substantially nil or a slight amount of light that is diffusely reflected. The noise light Ln0 reflected on the inner surface of the light incident surface 22 can be of such an extent that exerts no influence on the pictured image, i.e., substantially nil. Because noise light proceeding on a light path that does not overlap the non-reflective part 26 is not such light that inwardly reflected from the interior of the lens to the interior of the lens at the light incident surface 22 to agree with the light path of the imaging light L0 inside the lens, it does not become noise on the imaging light L0.

According to the panoramic imaging lens 20 of this embodiment, the noise light Ln0 causing flare and ghost is suppressed by the non-reflective part 26 to make a clear pictured image without noise, whereby the image quality is improved. According thereto, the imaging accuracy of a surveillance camera or the like is improved to enable good imaging for a dark place or a complicated image. The opening 28 may be a crucible former shape expanding toward the opening mouth, which is preferred particularly in the case where a resin lens is molded.

Figure 4:
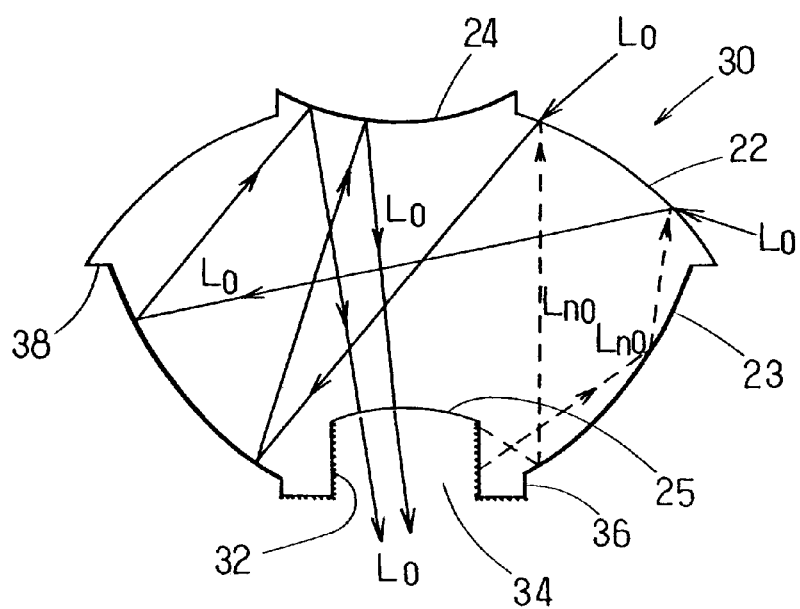
FIG. 4 is a cross sectional view showing a second embodiment of the panoramic imaging lens of the invention.

A panoramic imaging lens 30 according to a second embodiment of the invention will be described with reference to FIG. 4. The same members as in the foregoing embodiment are attached with the same symbols to omit the description. In this embodiment, the panoramic imaging lens has a non-reflective part 32 that exerts no regular reflection of light on a light path toward the light incident surface 22 amongst light paths of light proceeding to agree with the light path inside the lens of the imaging light L0 incident on and refracted at the light incident surface 22 and proceeding inside the lens, which are light paths inside the lens of light partly and inwardly reflected by the light incident surface 22 from the interior of the lens toward the interior of the lens. The non-reflective part 32 is formed to protrude from the light outgoing surface 25 of the panoramic imaging lens 30 toward a direction opposite to the second reflective surface 24. The non-reflective part 32 is formed to be a concave form, which is a cylindrical opening formed from the fringe of the first reflective surface 23 toward the second reflective surface 24, and the inner surface of the cylindrical concave part 34 is provided as the non-reflective part 32, with the bottom of the cylindrical concave part 34 being formed as the light outgoing surface 25.

The fringe of the opening of the non-reflective part 32 is formed to protrude from the fringe of the first reflective surface 23 to form a annular part, and the annular part 36 becomes an affixing part for fixing the panoramic imaging lens 30 to the panoramic imaging adapter 10 as shown in FIG. 1.

The cylindrical concave part 34 and the annular part 36 are formed in a rotation symmetrical form around the light axis of the panoramic imaging lens 30. The side peripheral surface of the cylindrical concave part 34 of the non-reflective part 32 and the end surface of the annular part 36 of this embodiment are formed to be black or a dark color and are appropriately formed to be a roughened surface.

In the panoramic imaging lens 30 of this embodiment, a flange part 38 is unitedly formed in a boundary part between the light incident surface 22 and the first reflective surface 23. The flange part 38 becomes, a positioning part and a supporting part for installing the panoramic imaging lens 30 to the panoramic imaging adapter.

The same effect as in the foregoing embodiment can be obtained by the panoramic imaging lens 30 of this embodiment, and installation to the panoramic imaging adapter or the like can be easy and reliable by the annular part 36 and the flange part 38. Furthermore, owing to the flange part 35 unitedly formed in the boundary part between the light incident surface 22 and the first reflective surface 23, a supporting member upon installation to the panoramic imaging adapter or the like becomes unnecessary, whereby the angle of view upon picturing can be broadened. The cylindrical concave part 34 may be a crucible former shape expanding toward the opening mouth, which is preferred particularly in the case where a resin lens is molded. In the case where the panoramic imaging lens 30 is formed with a transparent resin, when a gate for injection is formed at the annular part 36, treatment of gate spot can be easily carried out.

Figure 5:
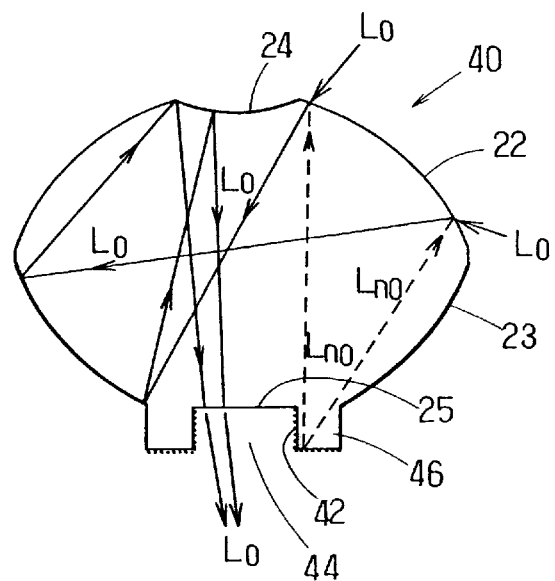
FIG. 5 is a cross sectional view showing a third embodiment of the panoramic imaging lens of the invention.

A panoramic imaging lens 40 according to a third embodiment of the invention will be describe with reference to FIG. 5. The same members as in the foregoing embodiments are attached with the same symbols to omit the description. In this embodiment, a non-reflective part 42 that exerts no regular reflection of light is provided on a light path toward the light incident surface 22 amongst light paths of light proceeding to agree with the light path inside the lens of the imaging light L0 incident on and refracted at the light incident surface 22 and proceeding inside the lens, which are light paths inside the lens of light partly and inwardly reflected by the light incident surface 22 from the interior of the lens toward the interior of the lens. The non-reflective part 42 is formed to protrude from the light outgoing surface 25 of the panoramic imaging lens 40 toward a direction opposite to the second reflective surface 24. The non-reflective part 42 is formed to be an annular part 46 protruding from a fringe of the first reflective surface 23 to surround the light outgoing surface 25, and the annular part 46 becomes an affixing part for fixing the panoramic imaging lens 40 to the panoramic imaging adapter 10 as shown in FIG. 1. The part surrounded by the annular part 46 is formed to be a cylindrical concave part, and an inner surface and an end surface of the cylindrical concave part 44 are formed to be the non-reflective part 42, with the bottom of the cylindrical concave part 44 being formed as the light outgoing surface 25. The annular part 46 is formed in a rotation symmetrical form around the light axis of the panoramic imaging lens 40. The non-reflective part 42 of this embodiment is also formed to be black or a dark color and is appropriately formed to be a roughened surface.

The same effect as in the first embodiment can be obtained by the panoramic imaging lens 40 of this embodiment, and installation to the panoramic imaging adapter or the like can be easy and reliable by the annular part 46. The cylindrical concave part 44 may be a crucible former shape expanding toward the opening mouth, which is preferred particularly in the case where a resin lens is molded.

Figure 6:
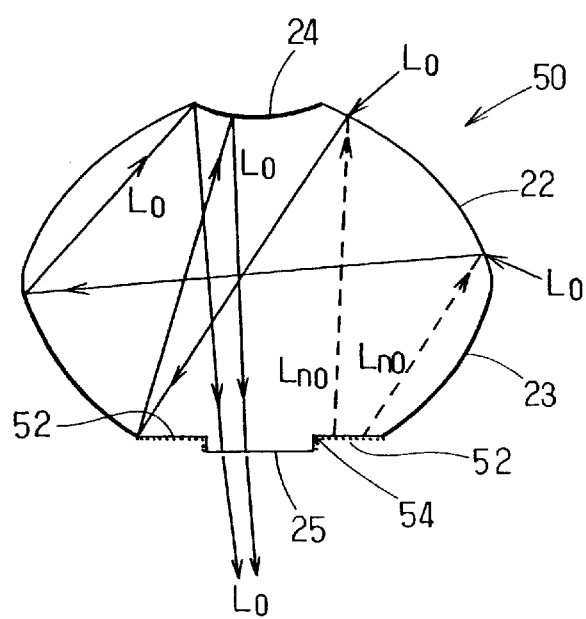
FIG. 6 is a cross sectional view showing a fourth embodiment of the panoramic imaging lens of the invention.

A panoramic imaging lens 50 according to a fourth embodiment of the invention will be describe with reference to FIG. 6. The same members as in the foregoing embodiments are attached with the same symbols to omit the description. In this embodiment, a non-reflective part 52 that exerts no regular reflection of light is provided on a light path toward the light incident surface 22 amongst light paths of light proceeding to agree with the light path inside the lens of the imaging light L0 incident on and refracted at the light incident surface 22 and proceeding inside the lens, which are light paths inside the lens of light partly and inwardly reflected by the light incident surface 22 from the interior of the lens toward the interior of the lens. The non-reflective part 52 is formed on a step part 54 formed by cutting a part between the first reflective surface 23 and the light outgoing surface 25 of the panoramic imaging lens 50 to an annular form.

The step part 54 is formed by cutting in an annular form to surround the light outgoing surface 25, and the step part 54 is constituted with a plane parallel to the light outgoing surface 25 and a plane that perpendicularly arises from that plane in a cylindrical form. The end surface of the cylindrical protruded part forms the light outgoing surface 25. The non-reflective part 52 of this embodiment is also formed to be black or a dark color and is appropriately formed to be a roughened surface.

The same effect as in the first embodiment can be obtained by the panoramic imaging lens 50 of this embodiment.

Figure 7:
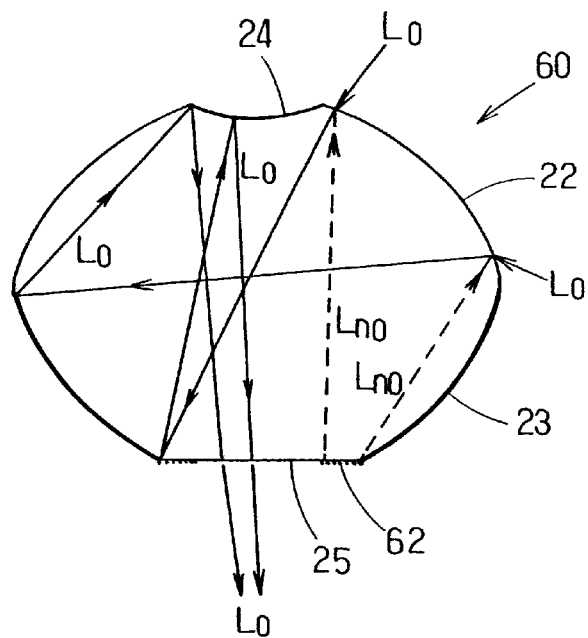
FIG. 7 is a cross sectional view showing a fifth embodiment of the panoramic imaging lens of the invention.

A panoramic imaging lens 60 according to a fifth embodiment of the invention will be describe with reference to FIG. 7. The same members as in the foregoing embodiments are attached with the same symbols to omit the description. In this embodiment, a non-reflective part 62 that exerts no regular reflection of light is provided on a light path toward the light incident surface 22 amongst light paths of light proceeding to agree with the light path inside the lens of the imaging light L0 incident on and refracted at the light incident surface 22 and proceeding inside the lens, which are light paths inside the lens of light partly and inwardly reflected by the light incident surface 22 from the interior of the lens toward the interior of the lens. The non-reflective part 62 is formed in an annular form on a periphery of the same plane as the, light outgoing surface 25, which is between the inner fringe of the first reflective surface 23 and the light outgoing surface 25. The non-reflective part 62 of this embodiment is also formed to be black or a dark color and is appropriately formed to be a roughened surface.

Figure 8:
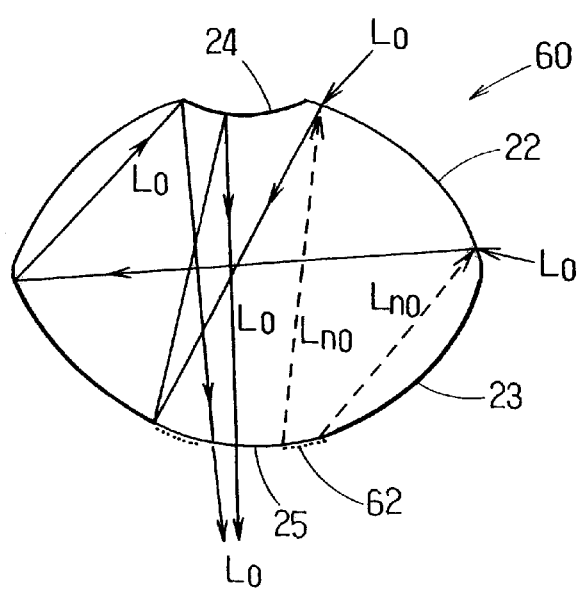
FIG. 8 is a cross sectional view showing a modified example of the fifth embodiment of the panoramic imaging lens of the invention.

The same effect as in the first embodiment can be obtained by the panoramic imaging lens 60 of this embodiment. Furthermore, in the case where the light outgoing surface 25 is in a convex lens form as shown in FIG. 8, the non-reflective part 62 may be similarly formed on a periphery of the light outgoing surface 25 and inside the fringe of the first reflective surface 23.

Figure 9:
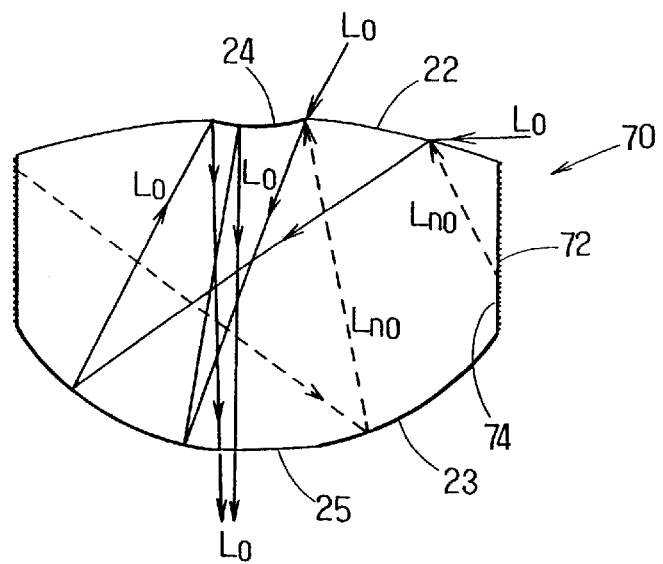
FIG. 9 is a cross sectional view showing a sixth embodiment of the panoramic imaging lens of the invention.

A panoramic imaging lens 70 according to a sixth embodiment of the invention will be describe with reference to FIG. 9. The same members as in the foregoing embodiments are attached with the same symbols to omit the description. In this embodiment, the curvature of the light incident surface 22 is relatively small, and the panoramic imaging: lens 70 has a prescribed thickness. The side peripheral surface 74 between the light incident surface 22 and the first reflective surface 23 is formed as a non-reflective part 72 that exerts no regular reflection of light. The non-reflective part 72 is provided on a light path toward the light incident surface 22 amongst light paths of light proceeding to agree with the light path inside the lens of the imaging light L0 incident on and refracted at the light incident surface 22 and proceeding inside the lens, which are light paths inside the lens of light partly and inwardly reflected by the light incident surface 22 from the interior of the lens toward the interior of the lens. The non-reflective part 72 of this embodiment is also formed to be black or a dark color and is appropriately formed to be a roughened surface.

The same effect as in the first embodiment can be obtained by the panoramic imaging lens 70 of this embodiment.

Figure 10:
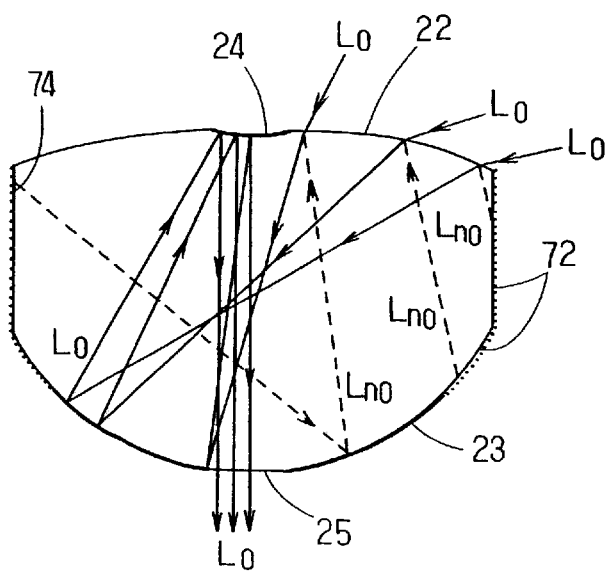
FIG. 10 is a cross sectional view showing a modified example of the sixth embodiment of the panoramic imaging lens of the invention.
Figure 11:
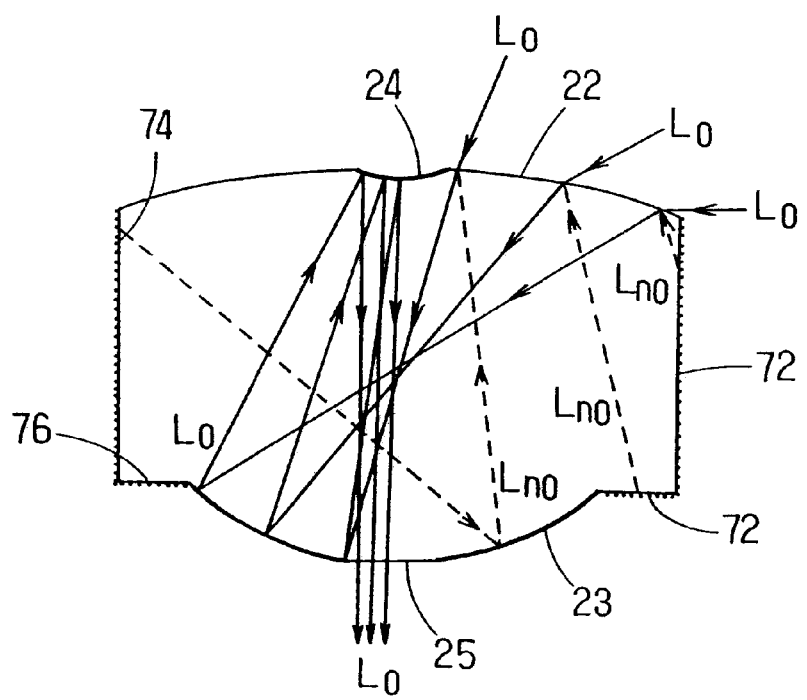
FIG. 11 is a cross sectional view showing another modified example of the sixth embodiment of the panoramic imaging lens of the invention.

As shown in FIG. 10, the annular non-reflective part 72 may be formed from the side peripheral surface 74 of the panoramic imaging lens 70 to the fringe of the first reflective surface 23. Furthermore, as shown in FIG. 11, the panoramic imaging lens 70 may be have such a shape that the first reflective surface 23 is formed as a convex lens form from the fringe of the side peripheral surface 74 on the side of the light outgoing surface 25 through an annular plane part 76 in parallel to the light outgoing surface 25. In this case, the plane part 76 is also formed as the non-reflective part. 72.

The panoramic imaging lens of the invention is not limited to the foregoing embodiments, and the position and the shape of the non-reflective part may be appropriately selected, such as those embodiments that are combinations of the foregoing embodiments and the like. The lens may be, in addition to a lens unitedly molded, such a lens that has the function of the invention by accumulating plural lenses.

According to the panoramic imaging of the invention, noise light causing flare and ghost can be certainly suppressed by the non-reflective part to improve the quality of the pictured image. According thereto, the imaging accuracy of a surveillance camera or the like is improved to enable good imaging for a dark place or a complicated image, whereby image processing and the like can be made easy.

What is claimed is:

1. A panoramic imaging lens comprising an annular light incident surface formed in a rotation symmetrical form around a light axis in a substantial convex lens form bulging to enable incident of lateral light; a first reflective surface formed in an annular concave mirror form bulging outwardly that substantially opposes the light incident surface to reflect light inside the lens; a second reflective surface provided at a central part inside the annular light incident surface to reflect the reflected light from the first reflective surface toward an inner part of the annular first reflective surface; and a light outgoing surface positioned at a central part inside the annular first reflective surface and opposing the second reflective surface to transmit the light from the second reflective surface, wherein:

lateral incident light is refracted from said annular light incident surface toward the first reflective surface along first light paths, is reflected from said first reflective surface toward said second reflective surface, and is reflected from said second reflective surface through said light outgoing surface as imaging light, and other incident light is refracted from said annular light incident surface toward the first reflective surface and is reflected from said first reflective surface toward said annular light incident surface along second light paths and is reflected by said annular light incident surface toward the first reflective surface along light paths which agree with said first light paths; and wherein a non-reflective surface is provided on said panoramic imaging lens and on said second light paths to suppress reflection of light along said second light paths.

2. A panoramic imaging lens as claimed in claim 1, wherein the non-reflective part is a light absorbing part formed to be black or a dark color that absorbs light but does not reflect light, a diffused reflective part formed to be a roughened surface that diffusely reflects light but does not regularly reflect light, or a combination thereof.

3. A panoramic imaging lens as claimed in claim 2, wherein the non-reflective part is an opening having a form of a cylinder that is formed in a rotation symmetrical form around a light axis of the panoramic imaging lens from the light outgoing surface toward the second reflective surface of the lens, and the opening has such a depth that a bottom of the opening is at a position on a side of the light outgoing surface with respect to a line connecting a fringe of the light incident surface on a side of the first reflective surface.

4. A panoramic imaging lens as claimed in claim 2, wherein the non-reflective part is an opening having a form of a cylinder that is formed in a rotation symmetrical form around a light axis of the panoramic imaging lens protruding from the light outgoing surface toward a direction opposite to the second reflective surface.

5. A panoramic imaging lens as claimed in claim 2, wherein the non-reflective part is formed on at least one of a periphery of the light outgoing surface and the first reflective surface of the panoramic imaging lens in an annular form with a light axis of the light outgoing surface as a center.

6. A panoramic imaging lens as claimed in claim 2, wherein the non-reflective part is formed on a side peripheral surface of the panoramic imaging lens formed between the light incident surface and the first reflective surface of the panoramic imaging lens.

* * * * *